(12) United States Patent
Bachmann et al.

(10) Patent No.: US 7,896,039 B2
(45) Date of Patent: Mar. 1, 2011

(54) DISTRIBUTOR FOR PAIRWISE DELIVERY OF TWO LIQUIDS

(75) Inventors: Christian Gottlieb Bachmann, Ellikon an der Thur (CH); Emil Fehr, Berg am Irchel (CH)

(73) Assignee: Sulzer Chemtech AG, Winterthur (CH)

( * ) Notice: Subject to any disclaimer, the term of this patent is extended or adjusted under 35 U.S.C. 154(b) by 1070 days.

(21) Appl. No.: 11/656,851

(22) Filed: Jan. 23, 2007

(65) Prior Publication Data

US 2007/0181213 A1    Aug. 9, 2007

(30) Foreign Application Priority Data

Jan. 25, 2006   (EP) .................... 06405033

(51) Int. Cl.
B65B 1/04    (2006.01)
(52) U.S. Cl. .............. 141/286; 141/100; 141/333; 141/297
(58) Field of Classification Search ............ 261/97, 261/113; 141/100, 105–107, 285, 286, 331, 141/333, 339, 297; 137/602, 255
See application file for complete search history.

(56) References Cited

U.S. PATENT DOCUMENTS

| | | | |
|---|---|---|---|
| 3,222,040 A * | 12/1965 | Eckert | 261/94 |
| 3,410,540 A | 11/1968 | Bruckert | |
| 4,159,291 A | 6/1979 | Bruckert | |
| 4,171,333 A * | 10/1979 | Moore | 261/94 |
| 4,729,857 A | 3/1988 | Lee | |
| 4,816,191 A | 3/1989 | Berven | |
| 5,244,604 A | 9/1993 | Miller | |
| 7,007,932 B2 * | 3/2006 | Armstrong et al. | 261/97 |
| 2004/0182013 A1 | 9/2004 | Kehrer | |

FOREIGN PATENT DOCUMENTS

| | | |
|---|---|---|
| DE | 601 02 391 T2 | 2/2005 |
| EP | 1 500 418 A | 1/2005 |
| JP | 51-120343 | 3/1976 |
| JP | 51-125665 | 11/1976 |
| JP | 54-62975 | 5/1979 |
| JP | 58-219917 | 12/1983 |
| JP | 63-162039 | 7/1988 |
| JP | 64-22303 | 1/1989 |
| JP | 1-304038 | 12/1989 |
| JP | 7-75730 | 3/1995 |

(Continued)

*Primary Examiner*—Timothy L Maust
*Assistant Examiner*—Jason K Niesz
(74) *Attorney, Agent, or Firm*—Francis C. Hand; Carella, Byrne, Cecchi

(57) ABSTRACT

The distributor serves for a pairwise delivery of two liquids to a plurality of infeed sites in a reactor or in a column with a density of at least 50 sites per $m^2$. The distributor has a pair of main passages that supply pairs of secondary passages with different liquid. Each pair of secondary passages is formed by a pair of upstanding side parts and an upstanding partition wall. Each side part has a base extending from a lower edge to the partition wall to define a secondary passage therewith for receiving liquid from a respective one of the main passages, and each base has a plurality of outlet apertures for the outflow of liquid from the respective secondary passage.

18 Claims, 3 Drawing Sheets

FOREIGN PATENT DOCUMENTS

| | | |
|---|---|---|
| JP | 9-141085 | 6/1997 |
| JP | 2001-517547 | 10/2001 |
| JP | 2004-351407 | 12/2004 |
| JP | 2005-66594 | 3/2005 |
| WO | WO 2007/03396 | 3/2007 |

\* cited by examiner

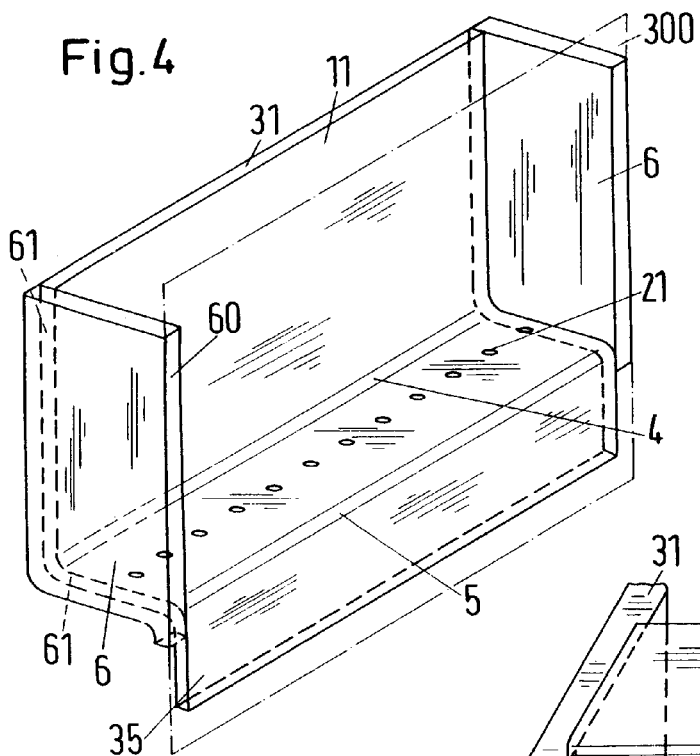
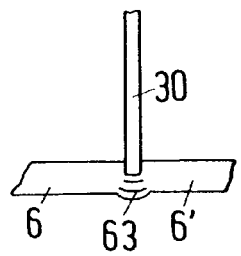
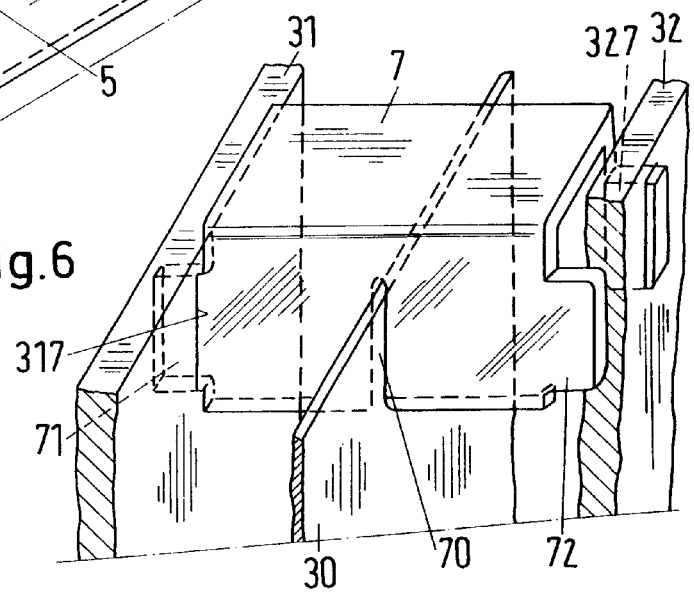
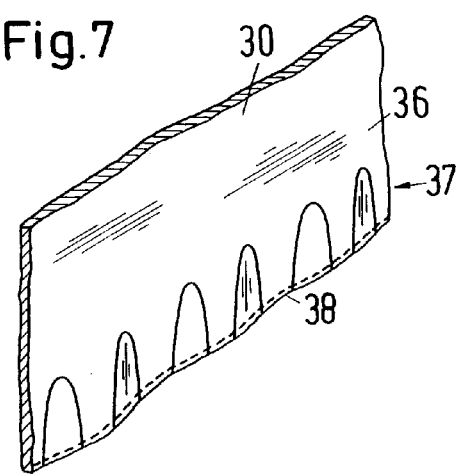
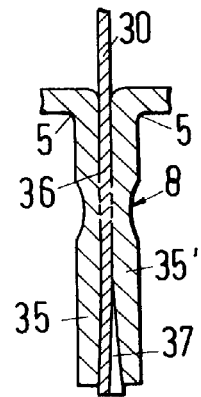

DISTRIBUTOR FOR PAIRWISE DELIVERY OF TWO LIQUIDS

The invention relates to a distributor for the pairwise delivery of two liquids to a plurality of infeed sites in a reactor or in a column as well as to a reactor or a column having such a distributor.

Chemical processes exist in which two liquid reactants have to be brought into contact on a support structure. To reduce unwanted side reactions, the two liquids must arrive at the support structure separately at a plurality of infeed sites arranged relatively densely and may only mix on the support structure. The support structure includes an inert or catalytically active substrate which, in particular, consists of packing elements in a column or of a bed of fillers in a fixed bed reactor. The chemical reactions take place on the substrate. A cross-sectional surface of the reactor or of the column forms an upper boundary of the support structure. The infeed sites are located on this cross-sectional surface. The support structure is permeable for the reactants in the vertical direction and can be compartmentalised with vertical separation spaces in which the substrate is contained and which are each associated with an infeed site. The infeed sites are arranged on a plurality of lines, in particular parallel straight lines.

In other processes, two non-miscible liquids must be supplied into a device in a predetermined quantity ratio in a well distributed manner. In these processes, distributors are necessary which permit a separate feeding of the liquids, for example in tube bundles of multi-tubular reactors or falling-film evaporators.

It is the object of the invention to provide a distributor which allows a pairwise and separate delivery of two liquids to a plurality of infeed sites with a density of at least 50 infeed sites per square meter ($m^2$).

Briefly, the invention provides a distributor comprised of a pair of horizontally disposed main passages for conveying different flows of liquid with each main passage having a plurality of drainage holes and a common wall separating the passages. In addition, the distributor has a plurality of pairs of secondary passages disposed below the main passages to receive liquid therefrom.

In accordance with the invention, each pair of secondary passages includes a pair of upstanding side parts and an upstanding partition wall between the side parts with a base of each side part extending from a lower edge to the partition wall to define a secondary passage therewith for receiving liquid from a respective one of the main passages. Each base also has a plurality of outlet apertures for the outflow of liquid from the respective secondary passage.

In use, the distributor serves for a pairwise delivery of two liquids to a plurality of infeed sites which are disposed on a horizontal cross-sectional surface in a reactor or in a column. The liquids can be supplied separately at each infeed site using the distributor. The infeed sites are arranged on a plurality of lines with a density of at least 50 sites per square meter ($m^2$). The cross-sectional surface of the infeed sites is spanned along these lines in each case by a pair of secondary passages. The secondary passages adjoin main passages and each pair of secondary passages forms a unit.

The side parts of each secondary passage pair may be shaped by folding with each respective base extending along a horizontal plane or an inclined plane. The side parts each merge into an end strip at the inner edges. A corresponding lower end strip of the partition wall is arranged between the end strips of the side parts and is connected to them.

The outlet apertures for the liquids may be in the bases or zones close to the bases of the side parts.

The side parts may be shaped so that the outlet apertures direct flows of liquid in a direction outwardly of the partition wall, for example, against deflection elements that deflect the outflows of liquid in a downward direction, or in a direction towards the partition wall. In addition, the side parts may be shaped so that the partition wall is spaced closer to one of the side parts than the other to define an asymmetric pair of secondary passages.

Stabilizing elements may also be mounted on upper edges of the side parts to bridge over the partition wall to fix the spacing between each respective side part and the partition wall.

The partition wall may also be shaped along a lower end strip to effect localized leaks of liquid from each secondary passage in an alternating manner with a corresponding drop formation of the liquid from each secondary passage.

These and other objects and advantages of the invention will become more apparent from the following detailed description taken in conjunction with the accompanying drawings wherein:

FIG. 4 illustrates a part-perspective vies of one half of a secondary passage pair;

FIG. 5 illustrates a detail of the secondary passage pair of FIG. 4;

FIG. 6 illustrates a perspective view of a stabilising element for the secondary passage pair in accordance with the invention;

FIG. 7 illustrates a lower edge of a partition wall shaped to provide for drops of liquid;

FIG. 8 illustrates a cross-sectional view through joined lower end strips of the secondary passage pair;

Figure 3:
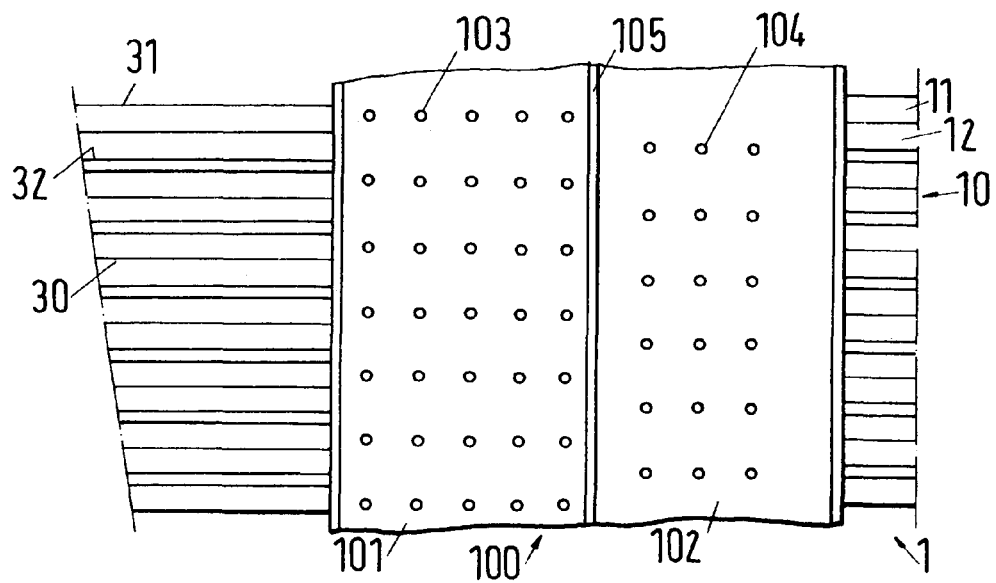
FIG. 3 illustrates a plan view of a section of a distributor in accordance with the invention.

Referring to FIG. 3, the distributor 1 with which two liquids can be delivered to a plurality of infeed sites includes a main passage pair 100 in which two main passages 101, 102 are separated by a common wall 105. As shown, each main passage 101,102 is provided with spaced apart rows of drainage holes 103, 104 that are in staggered relation to the rows of drainage holes in the other main passage 101,102. During use, each main passage 101,102 receives a different liquid from the other.

The main passage pair 100 is disposed over a plurality of pairs 10 of secondary passages 11, 12 to deliver the two different liquids simultaneously to the respective secondary passages 11, 12.

Figure 1:
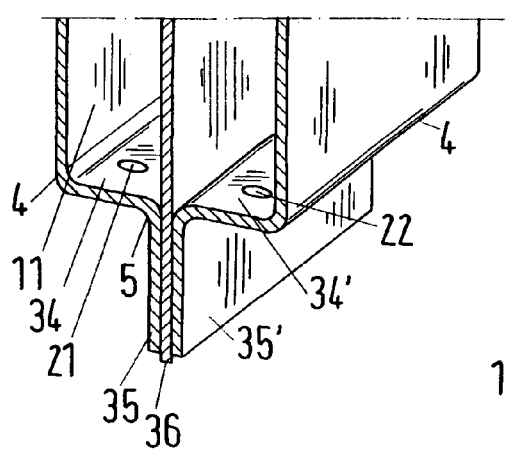
FIG. 1 illustrates a part sectional view of a secondary passage pair which is part of a distributor in accordance with the invention.

Referring to FIG. 1, each pair 10 of the secondary passages 11, 12 forms a unit that includes end walls 6 (see FIG. 4), side parts 31 and 32, which are shaped by folding, and a partition wall 30. Each side part 31, 32 is spaced from the partition wall 30 and has a base 34, 34' extending from a lower edge to the partition wall 30 to define a secondary passage 11, 12 therewith for receiving a liquid, and each said side part 31, 32 has a plurality of outlet apertures 21, 22 in the base 34, 34' for the outflow of liquid from respective secondary passage 11, 12.

The bases 34, 34' of the secondary passages 11, 12, in each case, extend on the side parts 31, 32 in a longitudinal direction between the passage ends along an outer edge 4 and an inner edge 5 which are aligned horizontally and are disposed on one plane which is horizontal or can also be inclined.

The side parts 31, 32 merge into longitudinal and downwardly directed end strips 35, 35' at the inner edges 5. A corresponding lower end strip 36 of the partition wall 30 is arranged between the end strips 35, 35' of the side walls 31, 32. The three ends strips 35, 36; 35' are connected to one another, for example, at a plurality of sites (see FIG. 8) by spot connections 8. A design of the secondary passage pair 10 is also possible in which the end strips 35 and 35' are directed vertically into the inner region of the secondary passage pair 10 above the inner edge 5. In this process, the end strips 35, 36, 35' are advantageously connected to one another, for example by roll seam welding, before the forming of the bent edges 4 and 5.

The outlet apertures 21 and 22 for the liquids are arranged adjacently for the pairwise delivery of the liquids from the secondary passages 11, 12. Instead of individual openings per passage 11, 12, two openings or groups of openings can also be provided in each passage 11, 12. The outlet apertures 21, 22 can also be located above the bases 34, 34' in zones of the side parts 31, 32 close to the bases.

The connection between the end strips 35, 36, 35' by the spot connections 8 is preferably established by spot welding; however, rivet connections, clinch formations (i.e. connections formed by means of clinch methods) and/or screw connections are also possible. Instead of the spot connections 8, contiguous connections can also be established, in particular, in each case in the form of a weld seam, a roll seam welding or a strip formed by melting. With the spot connections 8, gaps can be tolerated between the lower end strips 35, 36, 35' of the side parts 31, 32 or of the partition wall 30 if a total leak through these gaps is relatively small in the operation of the distributor 1, preferably no more than 1 percent of the liquid amounts delivered through the outlet apertures 21, 22. So that a mixing of the liquids seeping though the gaps only takes place to a low degree, the end strip 36 of the partition wall 30 advantageously projects a little downwardly beyond the end strips 35, 35' of the side parts 31, 32.

Figure 2:
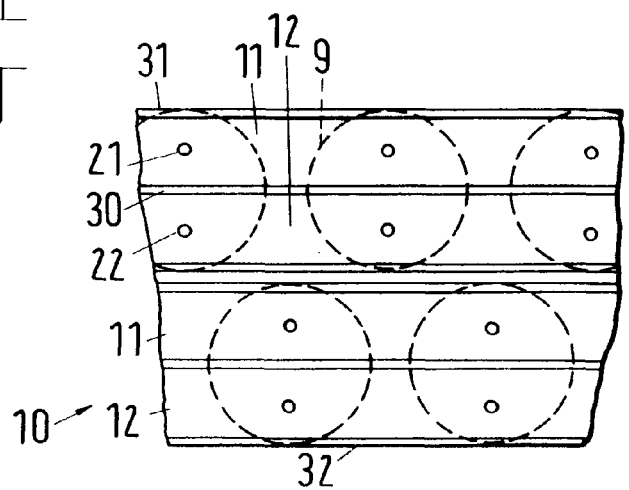
FIG. 2 illustrates a plan view of two secondary passage pairs.

Referring to FIG. 2, the infeed sites from distributor 1 are shown as circles 9 drawn with broken lines and disposed on a horizontal cross-sectional surface in a reactor or in a column and have a relatively large density of, for example, 50, 100, 300 or more sites per square meter ($m^2$). The infeed sites 9 are arranged on a plurality of parallel straight lines. Two liquids can be supplied separately at each infeed site 9. The horizontal cross-sectional surface is formed along lines of the infeed sites 9 arranged in a straight line in each case by a pair 10 of secondary passages 11, 12 which adjoin the main passages 101, 102.

During operation, a dosed distribution of the two liquids to the secondary passages 11, 12 takes place through the drainage holes 103 or 104 in the main passages (see FIG. 3). The holes 103 are associated with the secondary passages 11 and the holes 104 with the secondary passages 12.

The secondary passage pair 10, of which one half is shown in FIG. 4, can—contrary to what is shown—be higher and substantially longer in a longitudinal direction, namely at a maximum up to 3 or 4 meters (m), for example. The secondary passages 11, 12, for example, have a height which is 2 to 20 times, preferably 4 to 6 times, larger than the width of the secondary passage pair 10. This width can be small due to the construction in accordance with the invention, namely down to a minimum of around 30 millimeters (mm). Corresponding to this minimal width, the outlet apertures 21 or 22 are arranged in longitudinal spacings of around 40 millimeters (mm). If the partition walls 30 of adjacent secondary passage pairs 10 have a spacing, for example, of 36.4 millimeters (mm) and if the longitudinal spacing between the outlet apertures amounts to 42 millimeters (mm), a density results for the infeed sites 9 of 650 sites per square meter ($m^2$) (in the hexagonal arrangement of the infeed sites 9 as is present for the embodiment shown in FIG. 2). Gaps between adjacent secondary passage pairs 10 allow vapor or gas to escape upwardly from the support structure in counterflow. The width of the gaps is predetermined with respect to the process.

Referring to FIG. 4, the wall pieces 6 at the ends of the secondary passage 11 are shown with relatively thick walls; but this is not necessary. An edge surface 60 of the wall piece 6, which is located at the center of the secondary passage pair 10, as seen in the longitudinal direction, lies on a common plane 300 (shown with a chain-dotted frame) together with the inner side of the end strip 35. The partition wall 30 comes to lie on this plane 300. As shown in FIG. 5, the partition wall 30 and the wall piece 6 are tightly connected by means of a throughgoing weld seam 63 together with a wall piece 6' of the secondary passage 12 (not shown). A corresponding weld seam is provided along a contact strip 61 between the wall piece 6 and the side part 31. In all, six weld seams are to be established per secondary passage pair 10. The lateral passage termination can, however, also be made similar to the lower end of the passage pair 10 of FIG. 1 (not shown), with a junction having additionally to be welded. This junction corresponds to the horizontal section of the contact strip 61 in FIG. 4.

Due to the folding with the edges 4 and 5 and due to wall thicknesses which amount, for example, to 1 millimeter (mm), the side parts 31 and 32 effect a mechanical stability of the secondary passage pair 10 in its zone close to the base. Further measures for the increase of the stability can be one or more horizontal deformations, such as beads in the side parts 31 and 32 or a fold at its upper rim. Referring to FIG. 6, stabilising elements 7 can also be arranged at the upper rims (or edges) of the side parts 31, 32 and of the partition wall 30 in bridging relation to the partition wall 30 to fix the spacings between each respective side part 31, 32 and the partition wall 30. Each stabilizing element 7 has a U shape with two limbs and an upper surface piece connecting the limbs in the construction shown. The limbs are extended in their planes by two lugs 71, 72. Four openings 317 and 327 respectively, into which the four lugs 71, 72 can be plugged, correspond to these lugs 71, 72 in the side parts 31, 32. The lugs 71, 72 and openings 317, 327 can be made such that stable, force-transmitting connections arise between the element 7 and the side parts 31, 32 due to a wedge effect. To establish a connection which prevents a moving apart of the side parts 31, 32, hook-like parts can be provided at the rims of the upper surface pieces of the element 7 (not shown) with which the upper edges of the side parts 31 and 32 can be held in a shape matched manner. Vertical slits 70 in the limbs of the element 7 receive the upper rim of the partition wall 30.

The partition wall 30 can be substantially thinner than the side parts 31, 32, in particular of film form. The lower end strip 36 of the partition wall 30 is smooth in the simplest case and can also have a shape 37 as is illustrated in FIG. 7 to effect localized leaks of liquid from each secondary passage 11, 12 in an alternating manner and a corresponding drop formation of the liquid from each secondary passage 11, 12. As the cross-section in FIG. 8 shows, the spot connection sites 8 (in particular spot welds) are located above the zone on which the shape 37 is located. A localised leak and corresponding drop formation is effected at the lower edge 38 of the partition wall 30 due to the shape 37. The two liquids appear at alternating sites along the edge 38, where they drip off. The lower edge 38 of the partition wall 30 is advantageously roughened or is serrated with a fine toothed arrangement which obstructs a movement of drops along the edge 38 by making the movement more difficult or by prevents movement.

With respect to unequal properties of the two liquids (for example different viscosities), the secondary passage pairs 10 can be made correspondingly symmetrically (for example differently sized outlet apertures 21, 22 or differently wide passages). An asymmetric design can also be advantageous in the event that the liquid amounts provided for distribution are unequal.

Figure 9:
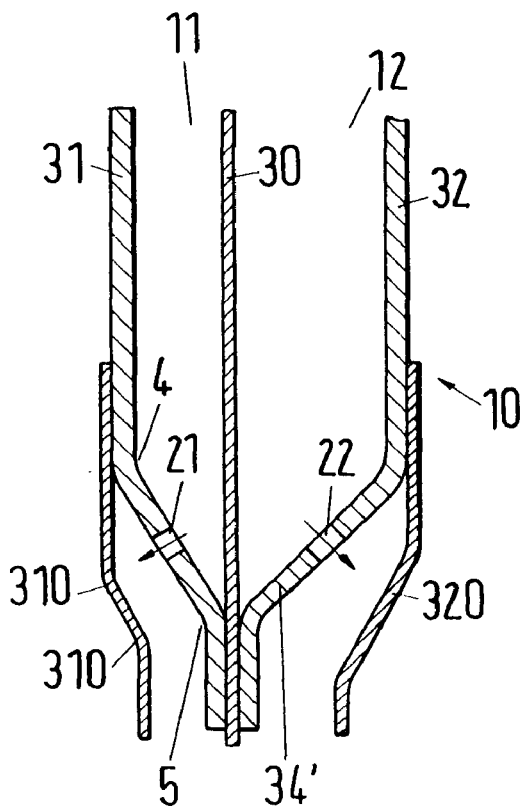
FIG. 9 illustrates a cross-sectional view of an asymmetric pair of secondary passages with deflection elements in accordance with the invention.
Figure 10:
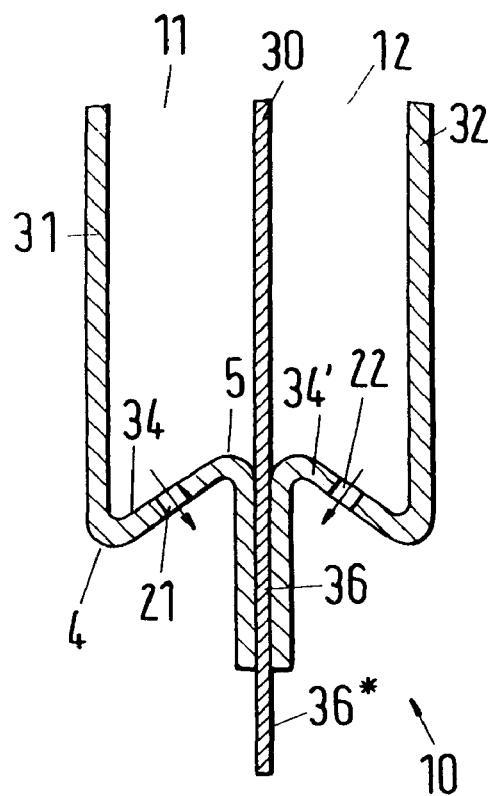
FIG. 10 illustrates a cross-sectional view of a pair of secondary passages with inwardly directed outlet apertures in accordance with the invention.

FIGS. 9 and 10 show cross-sections of further embodiments of the secondary passage pair 10. In these examples, the bases 34, 34' are inclined between the outer edge 4 and the inner edge 5.

In the case of FIG. 9, in which the secondary passage pair 10 is asymmetric, each base 34, 34' defines an acute angle with the partition wall 30 and the outlet apertures 21, 22 are disposed in each respective base 34, 34' to direct outflows of liquid in the form of jets in a direction away from the partition wall 30 as indicated by the arrows. In addition, a deflection element 310, 320 is mounted on each respective side part 31, 32 in facing relation to base 34, 34' thereof to deflect the jet outflows of liquid from the outlet apertures 21, 22 in a downward direction to the infeed sites 9. Each deflection element may have at least one of a horizontal grooving for transverse distribution of liquid thereon and a serrated lower edge.

In the case of FIG. 10, the bases 34 and 34' of the secondary passages 11, 12 are inclined to define an acute angle with the respective side part 31, 32 and so that the liquid jets are directed inwardly from the outlet apertures 21, 22 in a direction toward said partition wall. The impacting liquids are directed separately to the infeed sites on an extension 36* of the partition wall 30.

Instead of the skirt-like or planar deflection elements 310, 320 or 36*, tubular ones can also be provided. The delivery of the liquids can be shielded against surrounding infeed sites using tubular deflection elements (now shown) which are each associated with at least one pair of outlet apertures 21, 22.

The distributor 1 in accordance with the invention is suitable for a reactor or a column, in which chemical reactions should take place with two liquids to be supplied separately or in which two non-miscible liquids are to be fed in uniformly and in accordance with a predetermined mass ratio. A support structure includes inert or catalytically acting substrate on which the chemical reactions can be carried out with the two liquids as reactants. The support structure is permeable for the reactants in the vertical direction. A cross-sectional surface with the infeed sites 9 upwardly bounds the support structure. The substrate is at least partly provided by surfaces of the support structure; or it is in the form of a fixed bed and in particular has the shape of an ordered pack or of a packing of fillers. The support structure can have compartmentalisation formed by vertical part spaces and can be present, for example, in the form of tube bundles, such as are known from multi-tube reactors, or falling-film evaporators. At least one infeed site is associated with each part space.

The distributor 1 is also suitable, for example, for a column with falling-film evaporator tubes, in which non-miscible liquids have to be supplied.

What is claimed is:

1. A distributor for delivering two different liquids comprising a pair of horizontally disposed main passages for conveying different flows of liquid, each said main passage having a plurality of drainage holes therein;

a common wall separating said main passages; and a plurality of pairs of secondary passages disposed below said main passages to receive liquid therefrom, each said pair of secondary passages including a pair of upstanding side parts and an upstanding partition wall between said side parts, each said side part being spaced from said partition wall and having a base extending from a lower edge to said partition wall to define said secondary passage therewith for receiving a liquid, and each said side part having a plurality of outlet apertures for the outflow of liquid from said respective secondary passage.

2. A distributor as set forth in claim 1 wherein each said base is disposed in a horizontal plane.

3. A distributor as set forth in claim 1 wherein each said base is disposed angularly between a respective said side part and said partition wall.

4. A distributor as set forth in claim 3 wherein each said base defines an acute angle with said partition wall and said outlet apertures are disposed in said respective base to direct outflows of liquid in a direction away from said partition wall.

5. A distributor as set forth in claim 4 further comprising a pair of deflection elements, each said element being mounted on a respective side part in facing relation to said base thereof to deflect outflows of liquid from said outlet apertures in a downward direction.

6. A distributor as set forth in claim 5 wherein each said deflection element has at least one of horizontal grooving for transverse distribution of liquid thereon and a serrated lower edge.

7. A distributor as set forth in claim 3 wherein each said base defines an acute angle with said respective side part and said outlet apertures are disposed in each respective base to direct outflows of liquid in a direction toward said partition wall.

8. A distributor as set forth in claim 3 wherein said partition wall is spaced closer to one of said side parts than the other of said side parts to define an asymmetric pair of said secondary passages.

9. A distributor as set forth in claim 1 further comprising a plurality of stabilizing elements, each said stabilizing element being mounted on upper edges of said side parts and bridging over said partition wall to fix the spacings between each respective side part and said partition wall.

10. A distributor as set forth in claim 1 wherein said partition wall has a lower end strip of a shape to effect localized leaks of liquid from each said secondary passage in an alternating manner and a corresponding drop formation of the liquid from each said secondary passage.

11. A distributor as set forth in claim 1 wherein said partition wall has at least one of a roughened lower edge and a serrated lower edge to obstruct a transverse movement of liquid drops therealong.

12. A distributor as set forth in claim 1 wherein said base of each respective side part and said partition wall are fixedly connected together at lower ends thereof to form a unitary construction.

13. A distributor as set forth in claim 1 wherein said drainage holes in each said main passage are disposed in rows and in staggered relation to the rows of drainage holes in the other of said main passages to deliver liquid into respective secondary passages of said pairs of secondary passages.

14. A distributor as set forth in claim 1 wherein said outlet apertures of said secondary passages define liquid infeed sites with a density of at least 50 infeed sites per square meter.

15. A distributor for delivering two different liquids comprising
- a pair of upstanding side parts and an upstanding partition wall between said side parts, each said side part being spaced from said partition wall and having a base extending angularly from a lower edge to said partition wall to define a secondary passage therewith for receiving a liquid and to define an acute angle with said partition wall,
- each said side part having a plurality of outlet apertures disposed in said respective base for the outflow of liquid from said respective secondary passage in a direction away from said partition wall, and
- a pair of deflection elements, each said element being mounted on a respective side part in facing relation to said base thereof to deflect outflows of liquid from said outlet apertures in a downward direction.

16. A distributor as set forth in claim 15 wherein each said deflection element has at least one of horizontal grooving for transverse distribution of liquid thereon and a serrated lower edge.

17. A distributor for delivering two different liquids comprising
- a pair of upstanding side parts and an upstanding partition wall between said side parts, each said side part being spaced from said partition wall and having a base extending from a lower edge to said partition wall to define a secondary passage therewith for receiving a liquid,
- each said side part having a plurality of outlet apertures for the outflow of liquid from said respective secondary passage, and
- said partition wall having a lower end strip of a shape to effect localized leaks of liquid from each said secondary passage in an alternating manner and a corresponding drop formation of the liquid from each said secondary passage.

18. A distributor for delivering two different liquids comprising
- a pair of upstanding side parts and an upstanding partition wall between said side parts, each said side part being spaced from said partition wall and having a base extending from a lower edge to said partition wall to define a secondary passage therewith for receiving a liquid,
- each said side part having a plurality of outlet apertures for the outflow of liquid from said respective secondary passage, and
- said partition wall having at least one of a roughened lower edge and a serrated lower edge to obstruct a transverse movement of liquid drops therealong.

* * * * *